United States Patent [19]

Harms, II et al.

[11] 4,455,227
[45] Jun. 19, 1984

[54] COMBINATION FILTER HEAT EXCHANGER

[75] Inventors: Harold H. Harms, II, Lake Park, Fla.; Corby J. Gould, Grass Valley, Calif.

[73] Assignee: Harmsco, Inc., North Palm Beach, Fla.

[21] Appl. No.: 474,042

[22] Filed: Mar. 10, 1983

[51] Int. Cl.³ ............................................. B01D 35/18
[52] U.S. Cl. .................................. 210/184; 210/243; 210/323.2
[58] Field of Search ............... 210/184, 185, 186, 243, 210/323.2

[56] References Cited

U.S. PATENT DOCUMENTS

| | | | |
|---|---|---|---|
| 171,328 | 12/1875 | Tardos, Jr. | |
| 1,760,340 | 5/1930 | Blackmore . | |
| 1,818,480 | 8/1931 | Hoppe . | |
| 2,068,473 | 1/1937 | Schwalge | 210/131 |
| 2,328,698 | 9/1943 | Wiessner | 210/184 |
| 2,337,893 | 12/1943 | Hutterer | 210/184 X |
| 2,356,334 | 8/1944 | Maude et al. | 23/252 |
| 2,432,475 | 12/1947 | Griffith | 210/122.5 |
| 3,034,652 | 5/1962 | Hobson, Jr. | 210/232 |
| 3,083,833 | 4/1963 | Kasten | 210/184 |
| 3,097,165 | 7/1963 | Kasten | 210/133 |
| 3,163,028 | 12/1964 | De Pas et al. | 68/12 |
| 3,200,948 | 8/1965 | Kasten | 210/184 |
| 3,289,839 | 12/1966 | Muller | 210/184 X |
| 3,315,737 | 4/1967 | Welch | 165/119 |
| 3,482,699 | 12/1969 | Kauffman et al. | 210/184 |
| 3,487,934 | 1/1970 | Seyler | 210/169 |
| 3,762,467 | 10/1973 | Poon et al. | 165/163 |
| 4,187,174 | 2/1980 | Harms | 210/243 |
| 4,191,648 | 3/1980 | Kaplan et al. | 210/186 |
| 4,322,297 | 3/1982 | Bajka | 210/742 |
| 4,349,434 | 9/1982 | Jaworski | 210/94 |

*Primary Examiner*—John Adee
*Attorney, Agent, or Firm*—Hugh A. Kirk

[57] ABSTRACT

The disclosure concerns a swimming pool-type filter comprising: (a) a stainless steel vertical cylindrical vessel with a removable domed cover and a horizontal partition sealed between the periphery of the cover and the open vessel, from which partition suspends a plurality of filter cartridges; and (b) a helically coiled heat exchanger coaxial of the vertical axis of the vessel and having its horizontal inlet and outlet ducts extending through the side of the vessel and supporting the coil. The filter cartridges fit inside and around the outside of the helical coil for easy removal, replacement and cleaning by lifting the partition after the cover has been removed. The inlet and outlet ducts for the liquid or water to be filtered and warmed are in the bottom of the vessel, with the outlet duct extending up through the vessel to the chamber above the partition in the domed cover.

8 Claims, 3 Drawing Figures

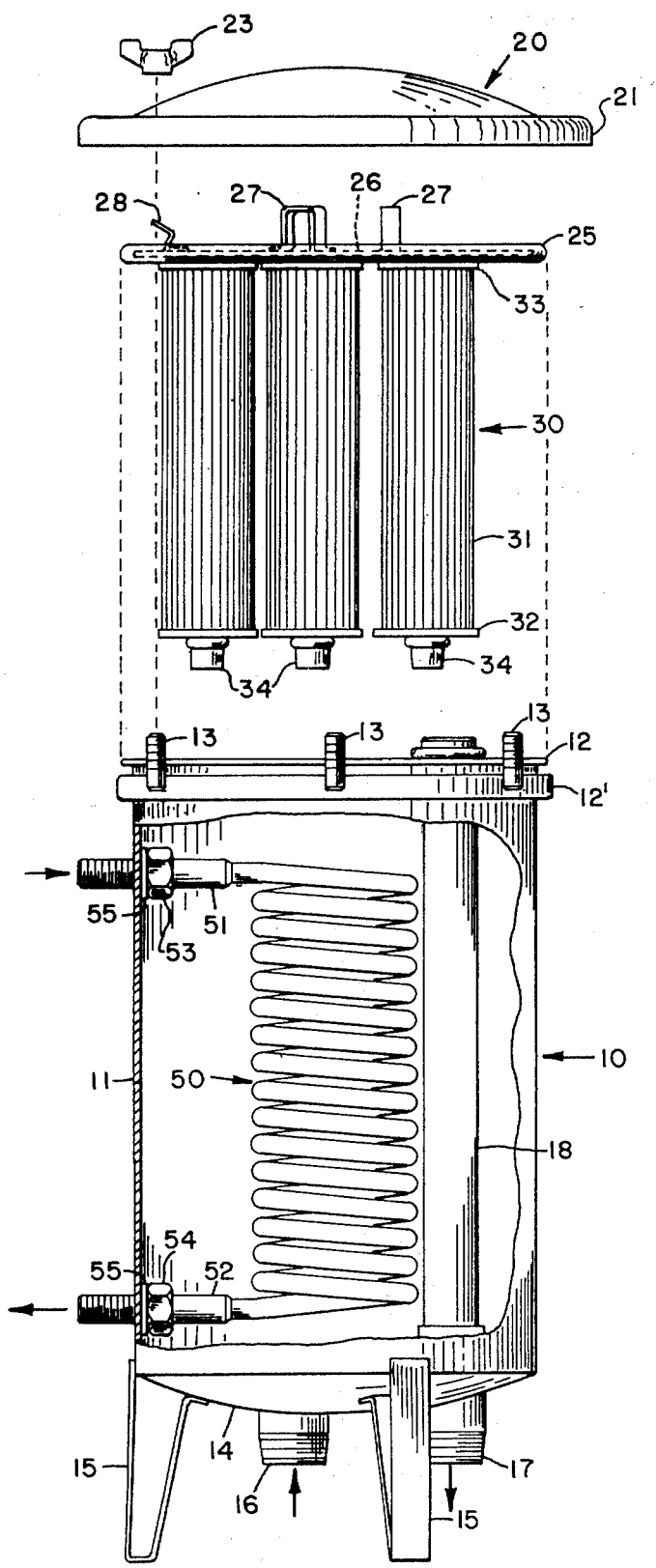
FIG. I

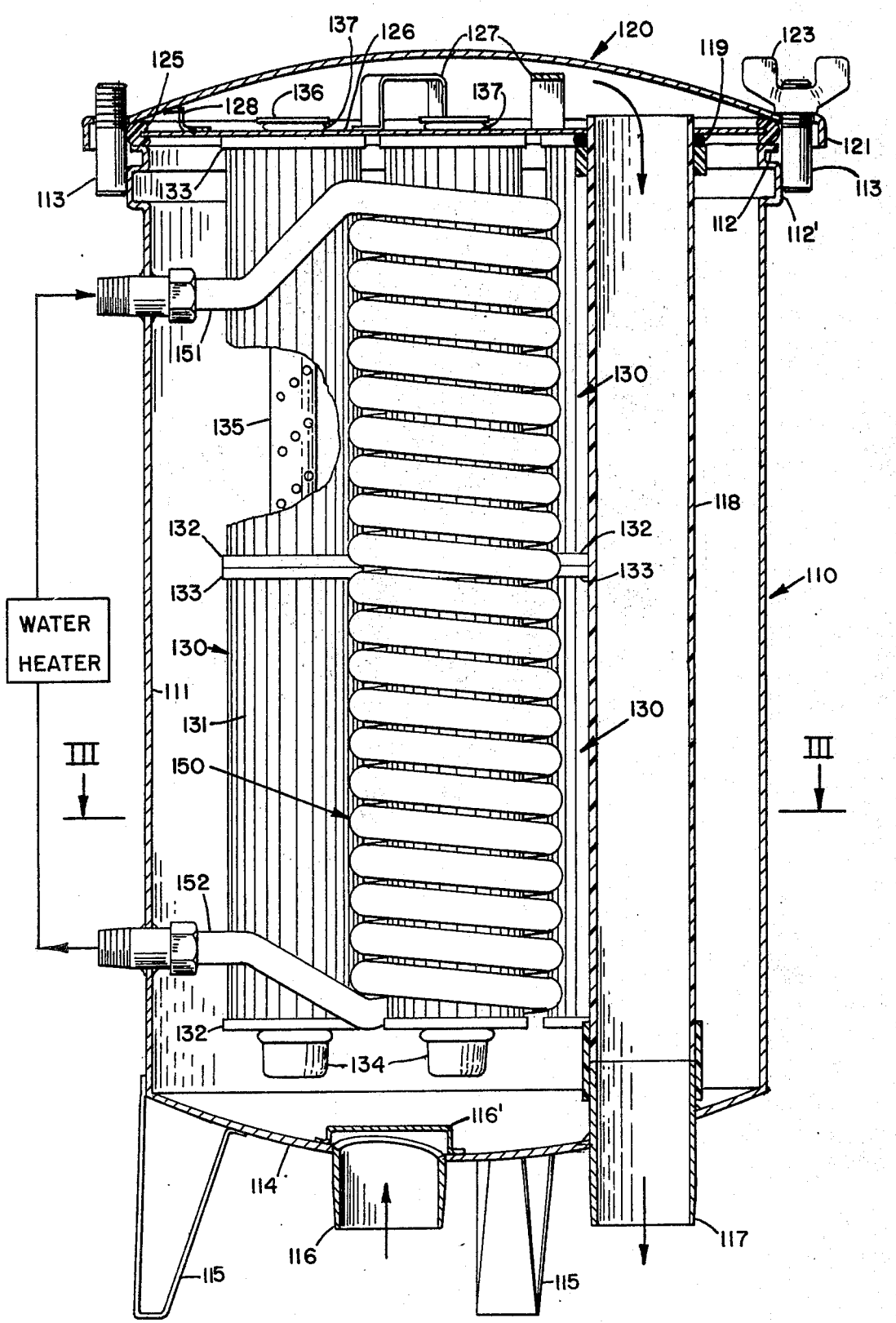
FIG. II

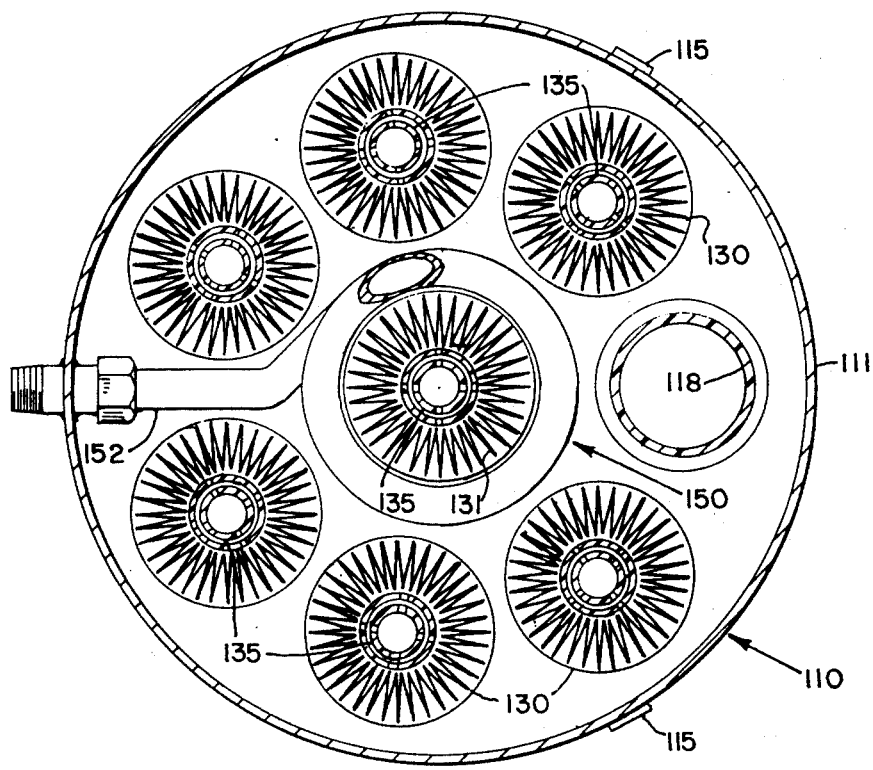
FIG. III

COMBINATION FILTER HEAT EXCHANGER

BACKGROUND OF THE INVENTION

Separate apparatus for filtering and heating the circulating water to a swimming pool have long been known. Even combination heat exchangers and filters have been known, but to applicants' knowledge no combination is known in which the filter cartridges were both surrounded by and surrounding the heat exchanger, and the filter cartridges also were easily removable for cleaning and/or replacement.

SUMMARY OF THE INVENTION

Generally speaking, the combination of this invention comprises a filter of the type shown in the two John Harms patents, U.S. Pat. No. 3,720,322 issued Mar. 13, 1973 and U.S. Pat. No. 4,187,179 issued Feb. 5, 1980, plus a helical heat exchanging coil for simultaneously heating the water that is being filtered without interfering or reducing the ease of removal, replacement and cleaning of the filter cartridges.

More specifically, this combination filter and heat exchanger comprises an open-top, usually cylindrical, vessel, preferably of stainless steel, having legs at its bottom to space it from a supporting floor so that the bottom inlet and outlet ducts are easily accessible. The open top of the vessel has an outwardly extending flange and equally angularly spaced there around vertically extending threaded studs over which the peripheral flange of a domed cover fits and is removably held in place by wing nuts on these studs. Between the periphery of the domed cover and the flanged rim of the vessel is a gasket which surrounds the peripheral edge of a partition plate from which plate the filter cartridges are suspended into the vessel. This usually circular plate contains an array of apertures, one in its center and the others substantially equally angularly spaced around the center. One aperture for the outlet duct extends up from the bottom of the vessel and seals with an outer aperture in the partition plate to remove the clean liquid which collects in the dome of the cover. Suspended from each of the other apertures in the plate is a perforated tube with a screw cap at its lower end which clamps one or more hollow center pleated fabric filter cartridges between the underside of the plate and the cap so that the dirty liquid entering the bottom of the vessel must pass through the pleated cartridge, and clean filtered liquid passes up inside the perforated tubes into the domed cover from whence it is removed through the raised outlet duct.

Surrounding the central cartridge but slightly spaced therefrom is a helical coil having inlet and outlet ducts extending radially horizontally therefrom between two adjacent cartridges in the circular array of cartridges surrounding the coil. These inlet and outlet ducts are fixedly attached to holes therefor in the vertical side of the vessel. A heated fluid, such as hot water from a hot water heater, from a furnace, from a solar collector, or other heater, is circulated through the coil in the filter for warming the water that is filtered as it passes through the filter vessel.

A grounded contact preferably is attached to the filter plate to scratch against the dome cover or side of the vessel to prevent electrolysis action in the vessel as described in the above mentioned U.S. Pat. No. 4,187,179.

OBJECTS AND ADVANTAGES

It is an object of this invention to produce a simple, efficient, effective, non-corrosive, economic, and compact combination filter and heat exchanger.

Another object is to provide such a combination filter heat exchanger which may be heated by any connectable fluid heating source, such as from a solar collector, hot water heater, furnace, or the like.

Still another object is to provide such a combination cartridge filter and heat exchanger in which the cartridges are easy to clean, remove and replace.

A further object is to provide such a combination filter and heat exchanger for use in the circulating water for swimming pools, hot tubs, spas, etc.

BRIEF DESCRIPTION OF THE VIEWS

The above mentioned and other features, objects and advantages, and a manner of attaining them are described more specifically below by reference to embodiments of this invention shown in the accompanying drawings, wherein:

FIG. 1 is an exploded side elevational view of a simple form of the combination filter and heat exchanger of this invention with parts of the vessel broken away to show the heat exchanging coil in the vessel;

FIG. II is a vertical sectional view of an assembled and larger embodiment, than that above in FIG. I, of the combination heat exchanger filter of this invention; and FIG. III is a horizontal section taken in the direction of the arrows along line III—III in FIG. II showing the arrangement of the filter cartridges in and around the heat exchanger helical coil.

DETAILED DESCRIPTION OF PREFERRED EMBODIMENTS

Referring first to FIG. I the housing or vessel 10 for the filter cartridges 30 and heat exchanger 50 is shown with the filter cartridges removed from the vessel and the dome cover 20 also removed, showing how easy the filter cartridges can be replaced and/or cleaned without even contacting the heat exchanger 50. In this simple embodiment, the vessel 10 has cylindrical sides 11 and an open top having outwardly extending flange 12 and adjacent rib 12' to which rib 12' a plurality of vertically extending threaded studs 13 are welded in equally angularly spaced positions. The closed bottom 14 of the vessel 10 may be supported by three equally angularly spaced legs 15 and contains a centrally located inlet duct 16 for liquid to be filtered, and an offset outlet duct 17 which extends vertically upwardly through the vessel 10 by means of a tubular extension 18 which ends slightly above the rim flange 12.

The domed cover 20 for the vessel has an outwardly and downwardly extending peripheral flange 21 which contains equally spaced apertures for the studs 13 to project therethrough above the flange 21 for the application of the wing nuts 23 for removably clamping the cover 20 to the vessel 10.

Between the cover flange 21 and the vessel rim flange 12 there is provided a resilient gasket 25 around the periphery of a circular partitioned plate 26 which is provided with a plurality of apertures for suspending perforated tubes (see tube 135 in FIG. II) for supporting the filter cartridges 30. These cartridges 30 may comprise pleated fabric sheet filter material arranged in an annular cylinder form sealed at its ends with resilient plastic annular discs 32 and 33. These cartridges are held onto the suspended perforated tubes by caps 34 screwed onto the lower ends of the perforated tubes, which caps seal the lower ends of the cartridges and sealingly clamp the ends of the cartridges against the underside of the plate 26. The upper side of this plate 26 is provided with a plurality of inverted U-shaped handle brackets 27 which serve for both easy removal of the filter cartridge assembly 30 as well as for contacting the inside of the domed cover 20 to press the resilient gasket 25 on the plate into intimate contact with the rim 12 and to seal around the upper end of the outlet tube 18 (see seal 119 in FIG. II). Also there is shown a grounding contact 28 mounted to the plate 26 which scratchingly engages the inside of the cover 20.

Centrally and axially inside the chamber 10 is a helical tubular coil, preferably of stainless steel, having upper inlet and lower outlet radially outwardly extending ends 51 and 52 that are fastened into apertures in the sidewall 11 of the vessel 10 to support the coil 50 inside the vessel. These inlet 51 and outlet 52 ends of the coil 50 may be threaded for removable connection to the wall 11, as well as for connection with a heated fluid source, which is circulated through the coil 50, such as hot water from a hot water heater, as schematically shown in FIG. II. These end ducts 51 and 52 may be held by nut means 53 and 54, respectively, as shown in FIG. I, which clamp against gaskets and are held sealed by similar nut means (not shown) on the outer threaded projections of these duct ends 51 and 52. Of, if desired, the end ducts from the coil 50 may be connected to nipples or short pipe sections welded into the side of the vessel 10 as shown in FIG. II.

Referring now to the embodiment in FIG. II, similar elements to those described in FIG. I will have similar reference characters, except they will have a 100-digit in front of their numbers.

Some of the details shown in FIGS. II and III that are not shown in FIG. I comprise a baffle 116' over the inlet duct 116 inside the vessel 110 to distribute better the liquid in the vessel as it is introduced through the duct 116. Furthermore, the upper end of the outlet tubular extension duct 118 is shown to be provided with a gasket 119 around a flange at its upper end, which is also aided in sealing it to the dome chamber in the cover 120, by the pressure of the inverted U-shaped angle brackets 127 against the inside of the cover 120.

The central perforated tubes 135 have outwardly extending flanges 136 at their upper ends which engage gaskets 137 against the upper side of the plate 126 to seal the tubes 135 around the apertures therein. Screw caps 134 at the lower ends of the tubes 135 clamp the cartridges 130 with their plastic resilient annular end discs 132 and 133 together and against the underside of the partitioned plate 126 so as to seal the dirty liquid from entering the clean liquid chamber in the dome under the cover 120. Thus, all liquid to be filtered must pass around and/or inside the heat exchanger coil 150 and through the pleated filter medium 131 before passing through the perforated tubes 135, the clean liquid chamber in the domed cover 120, and the outlet ducts 118 and 117.

Referring to FIG. III, it is shown how the filter cartridges 130 are arranged so that one is inside of the coil 150 and the others are around the outside of the coil 150 in a substantially equal angular arrangement, except for the location of the outlet duct 118, and the wider spacing for the inlet and outlet ducts 151 and 152 to and from the heat exchanger coil 150.

It is to be clearly understood that the shape of the vessel 10 or 110 and the specific arrangement of the filter cartridges 30 or 130 around the heat exchanger 50 or 150 in the vessel 10 or 110 may be varied in different configurations without departing from the scope of this invention. Furthermore, it should be understood that preferably the vessel 10, 110 and cover 20, 120, and the heat exchanger coil 50, 150 are made of non-corrosive material, such as stainless steel; however, plastic may also be employed, such as for the outlet duct extension 18, 118, and cartridge-supporting perforated tubes 135 inside the vessel 10, 110.

While there is described above the principles of this invention in connection with specific apparatus, it is to be clearly understood that this description is made only by way of example and not as a limitation to the scope of this invention.

We claim:

1. A fluid cartridge filter comprising:
   (A) a vessel having an open end and a removable dome-shaped cover for the open end,
   (B) a single supporting plate for a plurality of filter cartridges, said plate having: apertures therein for said filter cartridges, said plate being removable with the cartridges thereon as a unit, and said plate being clampable at its edges between said open end of said vessel and its said cover, said unit having said filter cartridges mounted in all but one of said apertures in said plate, and said plate also having mounted thereon lifting means engaging the inside of said dome-shaped cover,
   (C) an outlet duct having one end thereof extending freely through said one aperture in said plate, said outlet duct having a shoulder and gasket near its said one end adjacent said plate on the opposite side of said plate from said lifting means whereby said gasket is the only means for sealing said outlet duct to said plate and said gasket is held in sealing engagement with said plate by said lifting means, and
   (D) a helical heat exchanger tube in said vessel supported by its inlet and outlet ducts through the wall of said vessel, whereby said helical tube surrounds at least one of said cartridge filters and is surrounded by the other of said cartridge filters, whereby said filter cartridges may be easily removed and replaced without interference with said heat exchanger tube.

2. A fluid cartridge filter according to claim 1 including means for circulating a heat exchanging fluid through said helical heat exchanger tube.

3. A fluid cartridge filter according to claim 1 including means for circulating a liquid to be filtered through said vessel and dome-shaped cover.

4. A fluid cartridge filter according to claim 1 wherein said cartridge filters are cylindrical and supported vertically from a horizontal said supporting plate.

5. A fluid cartridge filter according to claim 1 wherein said vessel is cylindrical with a vertical axis and said cartridge filters are cylindrical with vertical axes parallel to and spaced around the axis of said vessel.

6. A fluid cartridge filter according to claim 5 wherein one cartridge filter is the center cartridge filter in said vessel which is surrounded by said helical heat exchanger tube coaxial with said vessel.

7. A fluid cartridge filter according to claim 1 wherein said supporting plate has a continuous resilient gasket of V-shaped cross-section overlapping both sides and surrounding the peripheral edge of said plate for sealing said cover, said plate, and said open end of said vessel together.

8. A fluid cartridge filter according to claim 7 including a resilient electrically conducting contact means bridging said resilient gasket between said single supporting plate and said vessel.

* * * * *